United States Patent
Yamazaki

[11] Patent Number: 5,839,986
[45] Date of Patent: Nov. 24, 1998

[54] DIFFERENTIAL DEVICE WITH DISCONNECT

[75] Inventor: Nobushi Yamazaki, Tochigi-ken, Japan

[73] Assignee: Tochigi Fuji Sangyo Kabushiki Kaisha, Japan

[21] Appl. No.: 893,606

[22] Filed: Jul. 15, 1997

[30] Foreign Application Priority Data

Jul. 23, 1996 [JP] Japan .................................. 8-193497
Aug. 30, 1996 [JP] Japan .................................. 8-230576

[51] Int. Cl.⁶ .......................... F16H 48/10; B60K 23/08
[52] U.S. Cl. ............................................................. 475/230
[58] Field of Search .................................. 475/220, 230, 475/240

[56] References Cited

U.S. PATENT DOCUMENTS

| | | |
|---|---|---|
| 1,389,580 | 9/1921 | Davis . |
| 1,389,720 | 9/1921 | Ward . |
| 1,499,763 | 7/1924 | Davis . |
| 2,269,734 | 1/1942 | Powell . |
| 2,791,919 | 5/1957 | Wildhaber . |
| 2,869,399 | 1/1959 | Miles . |
| 3,021,731 | 2/1962 | Stoeckicht et al. . |
| 3,071,314 | 1/1963 | Flanagan . |
| 3,251,244 | 5/1966 | Nickell . |
| 3,412,632 | 11/1968 | McFiggans . |
| 3,528,323 | 9/1970 | Kamlukin . |
| 3,706,239 | 12/1972 | Myers . |
| 3,768,336 | 10/1973 | Wharton . |
| 4,365,524 | 12/1982 | Dissett . |

(List continued on next page.)

FOREIGN PATENT DOCUMENTS

| | | |
|---|---|---|
| 130806 | 6/1987 | European Pat. Off. . |
| 1105103 | 11/1955 | France . |
| 2126823 | 10/1972 | France . |
| 2553169 | 4/1985 | France . |
| 369548 | 2/1923 | Germany . |
| 1086136 | 1/1961 | Germany . |
| 1164187 | 2/1964 | Germany . |
| 2305306 | 8/1974 | Germany . |
| 2848206 | 5/1980 | Germany . |
| 3931745 | 3/1991 | Germany . |
| 4013196 | 10/1991 | Germany . |
| 4013202 | 10/1991 | Germany . |
| 4017800 | 12/1991 | Germany . |
| 4027368 | 3/1992 | Germany . |
| 4137931 | 5/1992 | Germany . |
| 4223374 | 1/1994 | Germany . |
| 51-144637 | 11/1976 | Japan . |
| 54-54765 | 4/1979 | Japan . |
| 54-69257 | 5/1979 | Japan . |
| 55-3058 | 1/1980 | Japan . |
| 55-64550 | 5/1980 | Japan . |
| 59-97346 | 6/1984 | Japan . |
| 59-141254 | 9/1984 | Japan . |
| 60-81275 | 6/1985 | Japan . |
| 62-200071 | 9/1987 | Japan . |
| 2010145 | 3/1994 | Russian Federation . |
| 1421-933 | 9/1988 | U.S.S.R. . |
| 1442-772 | 12/1988 | U.S.S.R. . |
| 917132 | 1/1963 | United Kingdom . |
| 1136959 | 12/1968 | United Kingdom . |
| 1142960 | 2/1969 | United Kingdom . |
| 1256990 | 11/1970 | United Kingdom . |
| WO 85/04936 | 11/1985 | WIPO . |
| WO 86/02420 | 4/1986 | WIPO . |

*Primary Examiner*—Dirk Wright
*Attorney, Agent, or Firm*—Graham & James LLP

[57] ABSTRACT

A differential device for a four wheel drive vehicle. The differential device has a differential gear mechanism which distributes driving force of an engine inputted through a differential case to a pair of side gears which in turn drive a pair of output shafts. A sleeve is connected to one of the output shafts and a movable member is movably connected to the sleeve. A dog clutch is formed between a flange member of a side gear and the movable member. A return spring urges the movable member towards a release position of the clutch. An actuator is provided for moving the movable member towards engagement of the dog clutch. The sleeve, the dog clutch, and the return spring are located together in the differential case.

11 Claims, 2 Drawing Sheets

U.S. PATENT DOCUMENTS

| | | |
|---|---|---|
| 4,677,876 | 7/1987 | Dissett . |
| 4,776,234 | 10/1988 | Shea . |
| 4,777,838 | 10/1988 | Aarestad . |
| 4,781,078 | 11/1988 | Blessing et al. . |
| 4,838,118 | 6/1989 | Binkley . |
| 4,954,122 | 9/1990 | Nakano et al. . |
| 5,019,021 | 5/1991 | Janson . |
| 5,021,038 | 6/1991 | Beigang . |
| 5,030,181 | 7/1991 | Keller . |
| 5,037,362 | 8/1991 | Teroka et al. .......................... 475/230 |
| 5,078,660 | 1/1992 | Williams et al. . |
| 5,083,987 | 1/1992 | Korner et al. . |
| 5,102,378 | 4/1992 | Gobert . |
| 5,108,353 | 4/1992 | Brewer . |
| 5,122,101 | 6/1992 | Tseng . |
| 5,139,467 | 8/1992 | Carpenter . |
| 5,146,801 | 9/1992 | Oda . |
| 5,147,252 | 9/1992 | Mace et al. . |
| 5,156,578 | 10/1992 | Hirota . |
| 5,169,370 | 12/1992 | Dye et al. . |
| 5,194,058 | 3/1993 | Amborn et al. . |
| 5,209,707 | 5/1993 | Teraoka . |
| 5,242,336 | 9/1993 | Hori . |
| 5,269,730 | 12/1993 | Hirota . |
| 5,269,732 | 12/1993 | Weiss et al. . |
| 5,282,775 | 2/1994 | Teraoka . |
| 5,295,923 | 3/1994 | Takefuta . |
| 5,310,389 | 5/1994 | Sato . |
| 5,326,333 | 7/1994 | Niizawa . |
| 5,366,421 | 11/1994 | Hirota . |
| 5,385,514 | 1/1995 | Dawe . |
| 5,389,048 | 2/1995 | Carlson . |
| 5,415,601 | 5/1995 | Cilano . |
| 5,441,461 | 8/1995 | Teraoka . |
| 5,458,546 | 10/1995 | Teraoka . |
| 5,458,547 | 10/1995 | Teraoka et al. . |
| 5,507,703 | 4/1996 | Madsack et al. . |
| 5,556,351 | 9/1996 | Hiraishi et al. . |
| 5,562,562 | 10/1996 | Teraoka . |
| 5,580,326 | 12/1996 | Teraoka . |
| 5,620,389 | 4/1997 | Sato . |
| 5,713,812 | 2/1998 | Hiraishi et al. . |
| 5,728,024 | 3/1998 | Ishizuka et al. . |

DIFFERENTIAL DEVICE WITH DISCONNECT

BACKGROUND OF THE INVENTION

The present invention relates to a differential device used on the wheel side to be separated when driven by two wheels, in a four wheel drive vehicle.

As a conventional differential device of this kind, for example, a device disclosed in JP A SHO56-135320 is well known. The differential device is equipped, at the output end on one side, with a connecting and disconnecting mechanism separating the transfer of driving force when driven by two wheels.

The connecting and disconnecting mechanism includes: a coupling sleeve movable in the axle shaft direction; an output axis of the differential device; an axle shaft located along the outward prolongation thereof; and a switching device connecting and disconnecting the transfer of driving force by operating the movement of the coupling sleeve. The connecting and disconnecting mechanism is located outside the differential case, and is positioned so as not to directly connect the output axis and the axle shaft.

When driven by four wheels, a shift fork connected to the coupling sleeve is pulled by a push-pull cable to move, and the coupling sleeve is located astride both the output axis and the axle shaft to connect both the output axis and the axle shaft. When driven by two wheels, the coupling sleeve moves along the output axis, and both the output axis and the axle shaft are separated from each other.

However, in the above structure, the connecting and disconnecting mechanism (switching device) is located outside the differential case, so that a differential carrier containing the differential device is made larger according to that, and compatibility with other differential carriers is lost.

Furthermore, the differential device is also different from other differential devices in that the output axis and the axle shaft are separated, and that a connecting structure for connecting both the output axis and the axle shaft, and the coupling sleeve is necessary, and that a support structure accompanied therewith or the like is necessary. That is, in a differential device for a four wheel drive vehicle, specialized members such as a differential carrier, an output axis, and an axle shaft are necessary. Consequently, when adding a connecting and disconnecting function of driving force so as to convert a two wheel drive vehicle to a four wheel drive vehicle, the number of parts increases and the range of conversion is widened. Accordingly, conversion of a two wheel drive vehicle and a four wheel drive vehicle from one to the other is accompanied with a large cost rising.

SUMMARY OF THE INVENTION

An object of the present invention is to obtain a differential device which can prevent increase of the number of parts and rising of cost by containing a connecting and disconnecting function of driving force, and by keeping compatibility of members.

To achieve the above object, the differential device according to the present invention comprises: a differential case; a differential gear mechanism; a sleeve; a connecting mechanism; and an operating mechanism. The differential case is rotated by the driving force of an engine, and into the differential case, a first output axis and a second output axis are inserted coaxially with the rotational axis of the differential case. The differential gear mechanism is located in the differential case, and has a first side gear located coaxially with the rotational axis and a second side gear which is located coaxially with the rotational axis and is connected to the second output axis and rotates therewith, and it distributes the driving force of the engine inputted through the differential case between the first and second side gears. The sleeve is located in the differential case, and is connected to the first output axis and rotates therewith. The connecting mechanism is located in the differential case, and connects the first side gear and the sleeve in such a way that disconnecting is possible, and in a first state where the first side gear and said sleeve are separated, it does not transmit the rotation of the first side gear to the sleeve, and in a second state where the first side gear and the sleeve are connected, it transmits the rotation of the first side gear to the sleeve. The operating mechanism operates the connecting mechanism and switches the connecting mechanism between the first state and the second state.

Moreover, the connecting mechanism can comprise a movable member and a clutch. The movable member can freely move along the rotational axis, and is mounted so as to rotate together with one of the sleeve or the first side gear. The clutch is arranged so as to separate the movable member and the first side gear to create the first state when the movable member is in a first position apart from the other of the sleeve or the first side gear, and so as to connect the movable member and the first side gear to create the second state when the movable member is in a second position adjacent to the other of the sleeve or the first side gear.

Furthermore, the operating mechanism can comprise a return spring urging the movable member to one side of the first position or the second position, and an actuator which pushes the movable member toward the other side of the first position or the second position and moves it against the urging force of the return spring.

Moreover, the actuator can comprise an actuator body located outside the differential case and a pushing member which is inserted into the differential case and is interlocked with the actuator body and moves the movable member.

Furthermore, the differential gear mechanism can be a mechanism equipped with a first pinion gear and a second pinion gear which are slidably and rotatably contained in containing holes formed in the differential case, and are meshed with the first and second side gears respectively and are also meshed with each other.

In the above structure, when the connecting mechanism is in the second state, the first side gear and the sleeve are connected, and the driving force of the engine is distributed to the wheel side through the differential gear mechanism.

When the connecting mechanism is in the first state, the first side gear and the sleeve are separated, and the first side gear is in a racing state, and the driving force of the engine is not transmitted to the first axle shaft. Furthermore, since the first side gear becomes in a racing state, the driving force is not transmitted to the second axle shaft, too, and then, the driving force is cut off.

In the above structure, the sleeve connected to the first axle shaft, and the connecting mechanism connecting the sleeve and the first side gear in such a way that disconnecting is possible, are located in the differential case. Consequently, a differential carrier for supporting from the outside a differential device for a two wheel drive vehicle without cut-off function of driving force, can be also used in the above differential device for a four wheel drive vehicle. Furthermore, since the first and second axle shafts are not separated, an axle shaft for a two wheel drive vehicle can be used in the above differential device for a four wheel drive vehicle.

That is, compatibility of differential carriers and axle shafts is not lost, and a differential carrier and an axle shaft for a two wheel drive vehicle can be used without any modification, and the support structure of the axle shaft can also be simple. Consequently, a large number of members are compatible between a two wheel drive vehicle and a four wheel drive vehicle, and a two wheel drive vehicle and a four wheel drive vehicle can be converted from one to the other without increasing the number of parts and at low cost.

Furthermore, it is also possible to form, in the differential case, an opening for inserting a pushing member into the differential case so as to supply oil into the differential case through the opening.

According to the above structure, since the opening for inserting the pushing member into the differential case is utilized for taking oil in, it becomes unnecessary to form otherwise an opening portion for supplying oil into the differential case, and practice cost can further be decreased.

Moreover, it is also possible that the sleeve is located between the differential case and the first side gear, and is freely rotatably supported by the differential case, and the first side gear is freely rotatably supported by the sleeve.

Furthermore, it is also possible that on one side and the other side of the sleeve in the direction of the rotational axis of the sleeve, circular peripheral surfaces are formed respectively, and the peripheral surface on one side of the sleeve is supported from the outside by the circular inside surface formed in the differential case, and the first side gear is supported from the inside by the peripheral surface on the other side of the sleeve.

In such a structure, the differential case supports the sleeve and the sleeve supports the first side gear, so that the support structures of the sleeve and the first side gear become compact.

Accordingly, a differential device containing a cut-off function of driving force by using the sleeve and the connecting mechanism, can be formed without practically enlarging the size thereof, and the above mentioned conversion of a two wheel drive vehicle and a four wheel drive vehicle from one to the other can be performed more easily.

Furthermore, the clutch can be located outside the first side gear in the radial direction.

Moreover, it is also possible that on the first side gear, a flange portion extending outward in the radial direction of the rotational axis is formed, and the movable member is located facing to the flange portion so as to rotate together with the sleeve, and the clutch includes meshed teeth which are formed on the flange portion and the movable member respectively, and are meshed with each other when the movable member is located adjacent to the flange portion.

In the above structure, the clutch is located outside the first side gear in the radial direction, so that the diameter of the clutch becomes larger than the diameter of the first side gear. Accordingly, the clutch can transmits a larger torque than a clutch with a small diameter, and the durability of the clutch increases.

Furthermore, a differential device with the above structure can be mounted on a four wheel drive vehicle equipped with a cut-off mechanism for connecting the power transfer between both the engine and the differential device in such a way that disconnecting is possible, too.

In the above structure, when driven by four wheels, the cut-off mechanism is made to be in the connecting state, and the connecting mechanism is made to be in the second state, and the driving force of the engine is distributed and transmitted to the first and second axle shafts through the differential gear mechanism.

When driven by two wheels, the cut-off mechanism is made to be in the disconnecting state, and the connecting mechanism is made to be in the first state. Consequently, the power transfer system on the cut-off side for connecting the cut-off mechanism and the differential case, becomes in a state completely separated from the power transfer system on the engine side for connecting the engine and the cut-off mechanism and from the first and second axle shafts, and the first and second axle shafts are driven to rotate in a state where the power transfer system on the cut-off side including the differential case is stopped. That is, the power transfer system on the cut-off side does not rotate together with the first and second rotations, and rotational resistance decreases.

Thus, when driven by two wheels, the rotation of the power transfer system on the cut-off side is stopped, so that vibration decreases and comfortability to ride in increases, and wear of various parts of the power transfer system decreases and durability is improved. Furthermore, the load of the engine decreases according to the decrease of rotational resistance and fuel consumption rate is improved.

DESCRIPTION OF THE PREFERRED EMBODIMENTS

Figure 1:
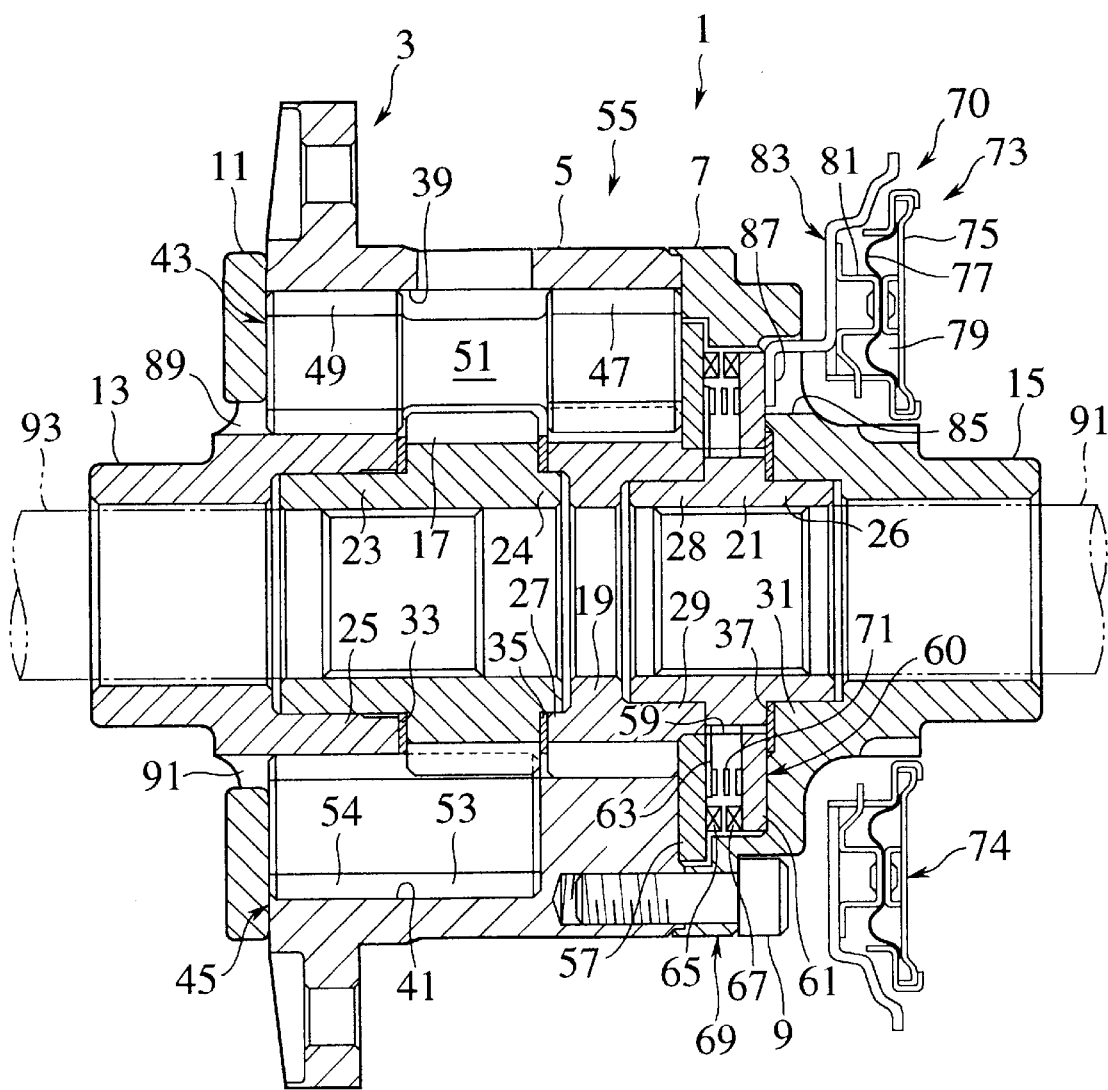
FIG. 1 is a cross sectional view showing an differential device of the present invention.

According to FIG. 1, an embodiment of the present invention will now be described. FIG. 1 shows a differential device 1 according to the embodiment. Further, the left and right directions in the following description are the left and right directions in FIG. 1, and members or the like given no marks are not shown in the figure.

The differential device 1 is mounted on a four wheel drive vehicle, and is located on the wheel side to be separated when driven by two wheels.

On the four wheel vehicle, a 2–4 switching mechanism (cut-off mechanism) is mounted besides the differential device 1. The 2–4 switching mechanism is located in a power transfer system connecting an engine and the differential device 1, and connects the power transfer between the engine and the differential device 1 in such a way that disconnecting is possible at all times. When driven by two wheels, the power transfer system on the differential device 1 side (cut-off side) is separated from the drive of the engine by the 2–4 switching mechanism.

The differential device 1 comprises: a differential case 3; a differential gear mechanism 55; a sleeve 21; a connecting mechanism 60; and an operating mechanism 70.

The differential case 3 includes a differential case body 5, a cover member 7, and a ring 11. The cover member 7 is secured on the right side of the differential case body 5 with a bolt 9, and the ring 11 is secured on the left side of the differential case body 5 with a bolt. The differential case 3 is located in the differential carrier, and left and right boss portions 13, 15 of the differential case 1 are rotatably supported by the differential carrier through bearings. An oil reservoir is formed in the differential carrier.

To the differential case 3, a ring gear is secured with a bolt. The ring gear is meshed with an output gear of the power transfer system, and the differential case 3 is driven to rotate by the driving force of the engine.

Into the differential case 3, a first axle shaft 91 and a second axle shaft 93 are inserted from both the right and left sides. The first and second axle shafts 91, 93 are located coaxially with the rotational axis of the differential case 3.

In the differential case 3, a first side gear 19 and a second side gear 17 on the output side each including a helical gear, are located on the right and left sides. On the right side of the first side gear 19, the sleeve 21 is located. The first and second side gears 19, 17 and the sleeve 21 are located coaxially with the rotational axis of the differential case 3.

To the second side gear 17 and to the sleeve 21, hollow boss portions 23, 24, 26, 28 projecting on both sides in the axial direction are formed respectively, and each of the boss portions 23, 24, 26, 28 has a peripheral surface with a circular cross section. On both sides in the axial direction in the first side gear 19, support portions 27, 29 having inside surfaces with circular cross sections are formed respectively. Furthermore, to the differential case body 5 and to the cover member 7, support portions 25, 31 having inside surfaces with circular cross sections are formed respectively.

The peripheral surface of the boss portion 23 on the left side of the second side gear 17 is rotatably supported by the inside surface of the support portion 25 of the differential case body 5 from the outside in the radial direction. The inside surface of the support portion 27 on the left side of the first side gear 19 is rotatably supported by the peripheral surface of the boss portion 24 on the right side of the second side gear 17 from the inside in the radial direction. The inside surface of the support portion 29 on the right side of the first side gear 19 is rotatably supported by the peripheral surface of the boss portion 28 on the left side of the sleeve 21 from the inside in the radial direction. The peripheral surface of the boss portion 26 on the right side of the sleeve 21 is rotatably supported by the inside surface of the support portion 31 of the cover member 7.

The boss portion 23 of the second side gear 17 is connected to the second axle shaft 93 by a spline, so that the second side gear 17 rotates together with the second axle shaft 93. The sleeve 21 is connected to the first axle shaft 91 by a spline, so that the sleeve 21 rotates together with the first axle shaft 91.

Between the second side gear 17 and the differential case 3, between both the side gears 17, 19, and between the sleeve 21 and the differential case 3, thrust washers 33, 35, 37 are located respectively.

In the differential case 3, a plurality of pairs of long and short containing holes 39, 41 are formed at equal intervals in the circumferential direction. In the containing holes 39, 41, a first long pinion gear 43 and a second short pinion gear 45 each including a helical gear are slidably and rotatably contained respectively.

The first long pinion gear 43 includes a first gear portion 47, and a second gear portion 49, and an axis portion 51 with a small diameter connecting the gear portions 47, 49. The first gear portion 47 of the first pinion gear 43 is meshed with the first side gear 19. The second short pinion gear 45 includes a first gear portion 53 and a second gear portion 54 having no axis portion between them. The first gear portion 53 of the second pinion gear 45 is meshed with the second side gear 17. The second gear portions 49, 54 of the first and second gears 43, 45 are meshed with each other on the left side in the axial direction of the side gears 17, 19.

Thus, the differential gear mechanism 55 comprises the first and second side gears 19, 17, the first and second pinion gears 43, 45, and the containing holes 39, 41 containing the pinion gears 43, 45. The driving force of the engine inputted through the differential case 3 is distributed between the first and second side gears 19, 17.

On the peripheral surface of the first side gear 19, a disc-like flange member 57 extending outward in the axial and radial directions is secured.

The connecting mechanism 60 comprises a movable member 61 and a dog clutch 69.

Around the periphery of the sleeve 21, a spline tooth 59 is formed in the axial direction. With the spline tooth 59, the movable member 61 and a retainer 63 are meshed axially movably. On the flange member 57 and the movable member 61, meshed teeth 65, 67 are formed respectively, and both the meshed teeth 65, 67 constitute the dog clutch (clutch) 69. The movable member 61 is located facing to the flange member 57. Both the meshed teeth 65, 67 are located outside the first side gear 19 in the radial direction.

When the movable member 61 is located in a first position apart from the flange member 57 (a first state), both the meshed teeth 65, 67 are separated, and the first side gear 19 and the sleeve 21 are divided, and the rotation of the first side gear 19 is not transmitted to the sleeve 21. That is, in the first state where the dog clutch 69 is released, the first side gear 19 is not connected to the wheel side.

When the movable member 61 is located in a second position adjacent to the flange member 57 (a second state), both the meshed teeth 65, 67 are meshed, and the first side gear 19 and the sleeve 21 are connected, and the rotation of the first side gear 19 is transmitted to the sleeve 21. That is, in the second state where the dog clutch 69 is connected, the first side gear 19 is connected to the wheel side.

In the second state, the driving force of the engine rotating the differential case 3 is transmitted through the first and second pinion gears 43, 45, to the left side wheel from the second side gear 17 through the second axle shaft 93, and at the same time to the right side wheel from the first side gear 19 through the dog clutch 69, the sleeve 21, and the first axle shaft 91. Furthermore, if a difference in driving resistance is created between the left and right wheels in a state such as running on rough roads, the driving force of the engine is differentially distributed between the left and right wheels by means of the rotations of the first and second pinion gears 43, 45.

When transmitting a torque, the tips of the teeth of the first and second pinion gears 43, 45 are pressed against the wall surfaces of the containing holes 39, 41 by the reaction force of the engagement of the first and second side gears 17, 19, and a frictional resistance is produced between both the tips and the wall surfaces. Furthermore, frictional resistances are produced by the thrust force of the engagement of the helical gears, between the first and second pinion gears 43, 45, and the differential case 3 and the ring 11, between the second side gear 17 and the differential case 3 through the thrust washer 33, between the first and second side gears 17, 19 through the thrust washer 35, and between the sleeve 21 and the differential case 3 through the thrust washer 37, respectively.

Torque responsive type differential limiting function is obtained because of the frictional resistances.

In the first state where the connection of the dog clutch 69 is released, the part from the sleeve 21 and the first axle shaft 91 to the right wheel is separated from the drive system of the engine to be in a state of free rotation, and the first side gear 19 comes to be in a state of racing. Thus, since the first side gear 19 comes to be in a state of racing, the driving force is not transmitted to the second axle shaft 93 on the second side gear 17 side and the left side wheel, and the driving force is cut off.

The operating mechanism 70 comprises a return spring 71 and an air actuator (actuator) 73.

The return spring 71 is located between the movable member 61 and the retainer 63 (the flange member 57 of the side gear 19). The return spring 71 urges the movable member 61 in the direction of departing from the flange member 57 (in the direction of releasing the connection of the dog clutch 69). Moreover, when the connection of the dog clutch 69 is released, the sliding on the sleeve 21 side and the first side gear 19 side is performed between the retainer 63 and the flange member 57, and the load caused by sliding is not applied to the return spring 71.

The air actuator 73 is equipped with an actuator body 74 and a pressure ring 83 as a pushing member. The actuator body 74 comprises a base plate 75, a diaphragm 77, a pressure chamber 79, and a bracket member 81. The actuator body 74 is shaped like a ring, and is located around the boss portion 15 on the right side of the differential case 3. The actuator body 74 is supported by the differential carrier through a support member.

The diaphragm 77 is air-tightly secured to the base plate 75, and between them, the pressure chamber 79 is formed. The bracket member 81 is secured to the diaphragm 77 by a screw.

The pressure ring 83 is attached on the left side of the diaphragm 77, and integrally has a leg 87 at the tip portion thereof.

In the differential case 3, a plurality of openings 85 are formed at equal intervals in the circumferential direction. Into each opening 85, the leg 87 of the pressure ring 83 is inserted, and the leg 87 faces to the movable member 61. In addition to such functions, the openings 85 function for supplying oil into the differential case 3.

When air pressure (positive pressure) is supplied into the pressure chamber 79 of the air actuator 73, the diaphragm 77 is deformed to the left, and the movable member 61 is moved to the left through the leg 87 of the pressure ring 83, and the dog clutch 69 is meshed. Furthermore, when the supply of air pressure into the pressure chamber 79 is stopped, the movable member 61 returns to the right by the urging force of the return spring 71, and the engagement of the dog clutch 69 is released.

The 2–4 switching mechanism and the dog clutch 69 are operated to build a connection at the same time, and are operated to release the connection at the same time.

When the 2–4 switching mechanism and the dog clutch 69 are connected, as mentioned above, the differential gear mechanism 55 distributes the driving force of the engine between the wheels, and the vehicle is driven by four wheels.

When the connection of the 2–4 switching mechanism and the dog clutch 69 is released, the vehicle is driven by two wheels. When driven by two wheels, the power transfer system on the cut-off side connecting the 2–4 switching mechanism and the differential case 3 becomes in a state of being completely separated from the driving force of the engine (the power transfer system on the engine side connecting the engine and the 2–4 switching mechanism), and from the rotational force of the wheels (the first and second axle shafts 91, 93). Consequently, in a state where the rotation of the power transfer system on the cut-off side including the differential case 3 is stopped, the wheels touching the road surface and the first and second axle shafts 91, 93 connected to the wheels, are driven to rotate according to the running of the vehicle.

Thus, when driven by two wheels, the rotation of the power transfer system on the cut-off side is stopped, so that vibration is decreased and comfortability to ride in is improved, and wear of various portions of the power transfer system is decreased and durability is improved, and further, the load of the engine is decreased according to the decrease of rotational resistance and fuel consumption rate is improved.

When the differential device 1 rotates, the oil in the oil reservoir of the differential carrier flows out into the differential case 3 from the opening 85 and the openings 89, 91 located on the left end sides of the containing holes 39, 41, and the oil flowing in lubricates the spline tooth 59 of the sleeve 21, the dog clutch 69, the sliding surface between the flange member 57 of the side gear 19 and the retainer 63, and the like. Furthermore, the oil lubricates the containing holes 39, 41 and the various gears of the differential gear mechanism 55.

Thus, the differential device 1 is composed.

As mentioned above, in the differential device 1, the sleeve 21 is located inside the differential case 3, and the dog clutch 69 is located between the movable member 61 on the sleeve 21 side and the flange member 57 of the side gear 19. That is, the cut-off function of the driving force is formed in the differential case 3, so that the size and shape of the whole differential device 1 can be formed nearly similar to the size and shape of a differential device for a two wheel drive vehicle without such a cut-off mechanism of driving force. Consequently, a differential carrier for a two wheel drive vehicle can be used in the differential device 1 for a four wheel drive vehicle, too.

Furthermore, since the first and second axle shafts 91, 93 are not separated, an axle shaft for a two wheel drive vehicle can be used for the differential device 1 for a four wheel drive vehicle. Moreover, the support structure (bearing) of the axle shafts 91, 93 can also be made simple.

That is, the compatibility of the differential carrier and the axle shafts 91, 93 is not lost, and a differential carrier and axle shafts for a two wheel drive vehicle can be used without any modification, and the support structure of the axle shafts 91, 93 can also be made simple.

Consequently, it becomes unnecessary to prepare specialized members as the differential carrier 3, the axle shafts 91, 93, and the like in order to add the cut-off function of driving force, and it becomes possible to share a large number of members between a two wheel drive vehicle and a four wheel drive vehicle, and conversion of a two wheel drive vehicle and a four wheel drive vehicle from one to the other can be performed without increasing the number of parts and at low cost.

Furthermore, since the opening 85 for inserting the leg 87 of the pressure ring 83 into the differential case 3, is utilized for taking oil into the differential case 3, it is unnecessary to form otherwise an opening portion for supplying oil in the differential case 3, and furthermore, practice cost can be reduced.

Furthermore, the sleeve 21 is supported by the support portion 31 of the differential case 3, and the first side gear 19 is supported by the boss portion 28 of the sleeve 21, so that the support structure of the sleeve 21 and the first side gear 19 comes to be compact.

Accordingly, the differential device 1 containing the cut-off function of driving force by using the dog clutch 69, can be formed without enlarging the size practically, and conversion of a two wheel drive vehicle and a four wheel drive vehicle from one to the other can be performed more easily.

In addition to that, since the dog clutch 69 is located outside the tooth portion of the first side gear 19 in the radial direction, the diameter of the dog clutch 69 becomes larger than the diameter of the first side gear 19. Accordingly, the dog clutch can transmit a larger torque than a dog clutch with a small diameter, and durability is increased.

Furthermore, the connecting mechanism and operating mechanism are not limited to the mechanisms in the above embodiments.

Figure 2:
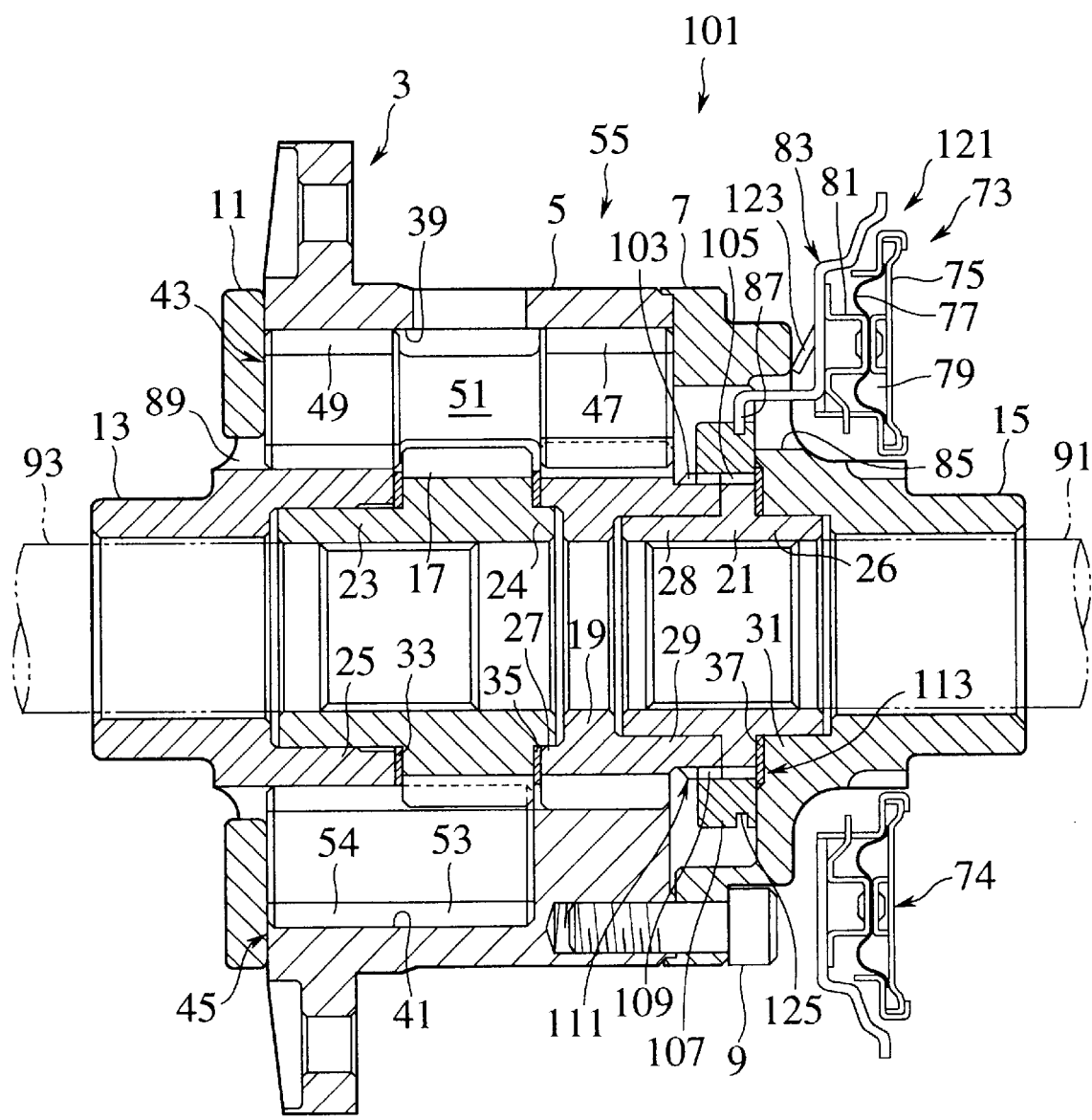
FIG. 2 is a cross sectional view showing the other differential device of the present invention.

For example, like a differential device 101 shown in FIG. 2, it is also possible that on the peripheral surfaces of the sleeve 21 and the first side gear 19, spline teeth 103, 105 are formed in the axial direction, and on the inside surface of a ring-like movable member 107, a tooth portion 109 meshed with both the spline teeth 103, 105 is formed. In the case, a dog clutch 111 comprises both the spline teeth 103, 105 and the tooth portion 109, and a connecting mechanism 113 comprises the movable member 107 and the dog clutch 111.

The movable member 107 can slide from the first side gear 19 side to the sleeve 21 side in the direction of the rotational axis, and is formed so as to rotate together with the first side gear 19. The movable member 107 becomes in a first state when it is in a position (a first position apart from the sleeve 21) after moving to the first side gear 19 side so as to be separated from the sleeve 21. In the first state, the tooth portion 109 of the movable member 107 is meshed with only the spline tooth 103 of the first side gear 19, so that the first side gear 19 and the sleeve 21 are separated. Further, the movable member 107 becomes in a second state when it is in a position (a second position adjacent to the sleeve 21) after moving to the first sleeve 21 side so as to get astride both the sleeve 21 and the first side gear 19. In the second state, the tooth portion 109 is meshed with both the spline teeth 103, 105, so that the first side gear 19 and the sleeve 21 are connected.

Moreover, a return spring 123 of an operating mechanism 121 can be formed integrally with a pressure ring 83 constituting the air actuator 73. The tip of the return spring 123 touches the outside surface of the differential case 3, and by the return spring 123, the movable member 107 is urged to the first position side. The leg 87 of the pressure ring 83 is connected to a ditch portion 125 formed in the peripheral surface of the movable member 107.

When air pressure (positive pressure) is supplied into the pressure chamber 79 of the air actuator 73, the return spring 123 is deformed, and the movable member 107 moves to the left side through the leg 87 of the pressure ring 83, and the engagement of the dog clutch 111 is released. Furthermore, when the supply of air pressure into the pressure chamber 79 is stopped, the movable member 107 returns to the right side by means of the urging force of the return spring 123, and the dog clutch 111 is engaged.

In such a structure, the return spring 123 is formed integrally with the pressure ring 83, so that the number of parts decreases and the differential device 101 comes to be more compact.

Moreover, in such a structure, even though the air actuator 73 or an air pressure supply system fail, the dog clutch 111 is engaged by means of the urging force of the return spring 123 and the movable member 107 becomes in the second state so that the driving force of the engine can be transmitted to the wheels.

Furthermore, it is also possible to arrange the movable member so as to rotate together with the sleeve. In the case, the movable member becomes in the second state when it is in a position (a second position adjacent to the first side gear) astride the sleeve and the first side gear, and it becomes in the first state when it is in a position (a position apart from the first side gear) after moving to the sleeve side so as to be separated from the first side gear.

Moreover, by locating such a dog clutch outside the tooth portion of the first side gear in the radial direction, a larger torque can be transmitted and durability is increased.

Furthermore, in the present invention, the differential gear mechanism is not limited to mechanisms in the above embodiments. For example, it may be a bevel gear type differential gear mechanism.

Moreover, the actuator is also not limited to air actuators in the above embodiments. For example, it may be an air actuator to be operated by supplying negative pressure created in an intake manifold of the engine, an oil pressure actuator, an electric motor, or the like.

Furthermore, the differential device 1 according to the present invention can be used both as a front differential device (a differential device distributing the driving force of the engine between the left and right front wheels) and as a rear differential device (a differential device distributing the driving force of the engine between the left and right rear wheels).

What is claimed is:

1. A differential device comprising:
    a differential case rotated by driving force of an engine, into which a first axle shaft and a second axle shaft are inserted coaxially with a rotational axis thereof;
    a differential gear mechanism located in said differential case, and having a first side gear located coaxially with said rotational axis and a second side gear located coaxially with said rotational axis and connected to said second axle shaft to rotate together therewith, the differential gear mechanism distributing the driving force of the engine inputted through said differential case between said first and second side gears;
    a sleeve located in said differential case and connected to said first axle shaft to rotate together therewith;
    a connecting mechanism located in said differential case and connecting said first side gear and said sleeve in such a way that disconnecting is possible, the connecting mechanism not transmitting rotation of said first side gear to said sleeve in a first state where said first side gear and said sleeve are separated, and transmitting the rotation of said first side gear to said sleeve in a second state where said first side gear and said sleeve are connected; and
    an operating mechanism operating said connecting mechanism and switching said connecting mechanism between said first state and said second state.

2. A differential device described in claim 1, wherein said connecting mechanism has a movable member and a clutch,
    said movable member is arranged to freely move along said rotational axis and to rotate together with one of said sleeve or said first side gear, and
    said clutch separates said movable member and said first side gear to create said first state when said movable member is in a first position apart from the other of said sleeve or said first side gear, and connects said movable member and said first side gear to create said second state when said movable member is in a second position adjacent to the other of said sleeve or said first side gear.

3. A differential device described in claim 2, wherein said operating mechanism includes:
- a return spring urging said movable member to one side of said first position or said second position; and
- an actuator pushing said movable member to the other side of said first position or said second position so as to move said movable member against the urging force of said return spring.

4. A differential device described in claim 3, wherein said actuator includes:
- an actuator body located outside said differential case; and
- a pushing member inserted into said differential case and interlocked with said actuator body so as to move said movable member.

5. A differential device described in claim 4, wherein
said differential case has an opening for inserting said pushing member into said differential case, and
said opening functions to supply oil into said differential case.

6. A differential device described in claim 1, wherein
said sleeve is located between said differential case and said first side gear, and is rotatably supported by said differential case, and
said first side gear is rotatably supported by said sleeve.

7. A differential device described in claim 6, wherein
said sleeve has circular peripheral surfaces formed on one side and the other side in the direction of said rotational axis, respectively,
a peripheral surface on one side of said sleeve is supported from the outside by a circular inside surface formed in said differential case, and
said first side gear is supported from the inside by a peripheral surface on the other side of said sleeve.

8. A differential device described in claim 2, wherein
said clutch is located outside said first side gear in the radial direction.

9. A differential device described in claim 8, wherein
said first side gear has a flange portion extending outward in the radial direction of said rotational axis, and
said movable member is located facing to said flange portion so as to rotate together with said sleeve, and
said clutch includes meshed teeth located on said flange portion and said movable member respectively, and meshed with each other when said movable member is positioned adjacent to said flange portion.

10. A differential device described in claim 1, wherein
said differential gear mechanism has a first pinion gear and a second pinion gear slidably and rotatably contained in containing holes formed in said differential case, and meshed with each other while being meshed with said first and second side gears respectively.

11. A differential device mounted on a four wheel drive vehicle having, between an engine and the differential device, a cut-off mechanism connecting power transfer between both the engine and the differential device in such a way that disconnecting is possible, said differential device comprising:
- a differential case rotated by driving force of said engine, into which a first axle shaft and a second axle shaft are inserted coaxially with a rotational axis thereof;
- a differential gear mechanism located in said differential case, and having a first side gear located coaxially with said rotational axis and a second side gear located coaxially with said rotational axis and connected to said second axle shaft to rotate together therewith, the differential gear mechanism distributing the driving force of the engine inputted through said differential case between said first and second side gears;
- a sleeve located in said differential case and connected to said first axle shaft to rotate together therewith;
- a connecting mechanism located in said differential case and connecting said first side gear and said sleeve in such a way that disconnecting is possible, the connecting mechanism not transmitting rotation of said first side gear to said sleeve in a first state where said first side gear and said sleeve are separated, and transmitting the rotation of said first side gear to said sleeve in a second state where said first side gear and said sleeve are connected; and
- an operating mechanism operating said connecting mechanism and switching said connecting mechanism between said first state and said second state.

* * * * *